United States Patent Office 2,908,943
Patented Oct. 20, 1959

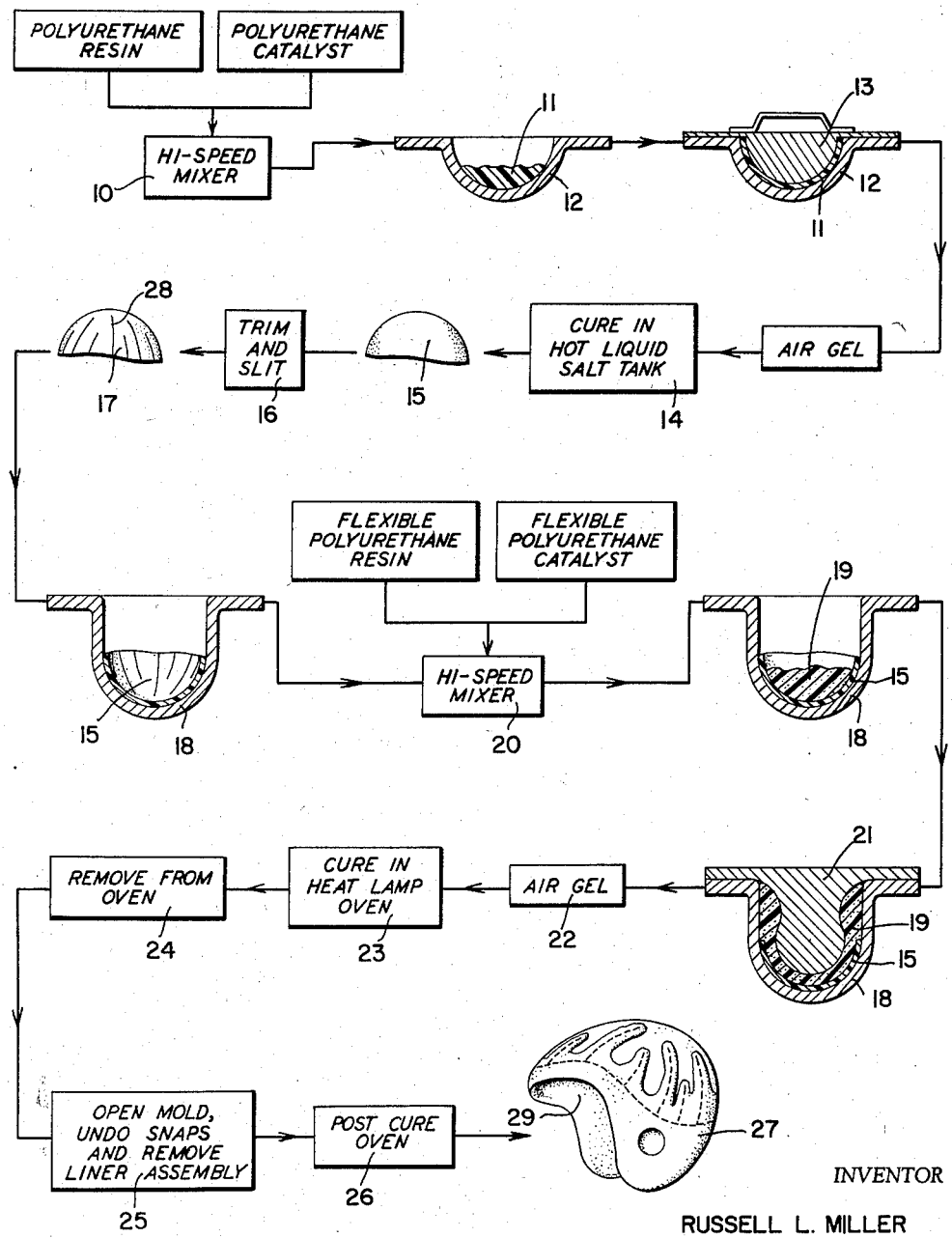

2,908,943
PROCESS FOR MOLDING TWO-LAYER POLYURETHANE ARTICLES

Russell L. Miller, Encinitas, Calif., assignor to Bill Jack Scientific Instrument Co., Solana Beach, Calif.

Application October 25, 1957, Serial No. 692,245

6 Claims. (Cl. 18—59)

This invention relates generally to a molding process and more specifically to a process for forming and joining together two pieces of the same class of material having different densities.

The primary object of this invention is to provide an improved molding process for forming and joining together two pieces of the same class of material having different densities with resulting different physical characteristics.

Another object of this invention is to provide a molding process for the production of liners for helmets of aircraft pilots in which the resulting liners desirably have both sound absorbing and energy absorbing characteristics of improved quality.

A more specific object of this invention is to provide an improved molding process for the production of aircraft pilot helmet liners wherein the liner is fabricated from two pieces of the same class of material having different densities.

Still another object of this invention is to provide an improved molding process for forming and joining together two pieces of the same class of foamable plastic material having different densities in which various physical characteristics desired in the final product are obtained by specific curing steps.

With the foregoing and other objects in mind, this invention resides in the following specification and appended claims with the process comprising the invention being illustrated in the diagram of the attached drawing:

In the production of liners for the rigid shells of aircraft pilot helmets such as worn by jet aircraft pilots, it is highly desirable that the liner have high sound absorbing characteristics as well as energy absorbing characteristics particularly in the crown portion of the liner.

After considerable experimentation with plastic material it was found that polyurethane is highly suitable for use in the production of such helmet liners. It was also found that by molding a crown cap portion of relatively high density polyurethane material and then subsequently joining the cap so formed during a second molding process of the liner proper, the entire liner so produced would provide a final product having a high density brittle crown portion for energy absorption purposes with the remaining portion of the cap covering the remaining portion of the interior of the pilot helmet being formed of a resilient lower density polyurethane material giving the entire liner high sound absorbing features.

In order to attain the highest quality liner from both the sound absorbing and energy absorbing standpoints, it has been necessary to develop a process for the proper curing of the liner so formed. Certain steps in the process relating to the curing become critical to attain and preserve these desirable features.

The specification of materials used in this process is as follows:

F29R Resin (polyurethane)—Nopco Chemical, Harrison, N.J.
F29C Catalyst—Nopco Chemical, Harrison, N.J.
826 Releasor Wax—Rezolin, Inc., Los Angeles, Calif.
604R Resin (polyurethane)—Nopco Chemical, Harrison, N.J.
604T Catalyst—Nopco Chemical, Harrison, N.J.
DC20 Silicon Mold Release—Dow Corning Corp., Midland, Minn.
Liquid salt—Blue Temp Salt #280—Far Best Corp., Los Angeles, Calif.
White gas
Steel wool Equipment desirable for the process is as follows:

Mixing container
Agitator
Laboratory scale
Spatula
Eye dropper
Fiber glass liner mold and mandrel with special fast action clamps
Infra-red lamp oven
Two part metal mold
Salt bath tank, temperature controlled
Infra-red curing oven, circulating heat controlled
Holding fixture for energy absorbing crown section
Band saw for cutting energy absorbing crown section While this process will be described as applicable to aircraft helmet liners it is conceivable that it might find utility in the joining of two or more pieces of the same class of material or different foamable plastic materials having different densities for the production of units applicable to other fields.

The process is preceded by a preparation of the equipment to be used. The metal mold for forming the crown section is cleaned and all contaminated material is removed with steel wool or other suitable material. The mold is then coated with a mixture of DC20 mold release and white gas in an approximate 50–50 percent ratio. A liquid salt bath is then heated to a temperature within the range of 375° to 425° F. The main liner fiber glass mold is then cleaned and treated with a mixture of DC20 mold release and white gas in an approximate 50–50 percent ratio.

With the equipment thus ready for the formation of a liner the process is commenced by mixing 58 parts by weight of 604R resin and 42 parts by weight of 604T catalyst. The proportion of resin to catalyst may be varied but it has been found that the ratio of 58 parts resin to 42 parts catalyst gives the optimum result for the crown section of the liner. This mixture is then thoroughly mixed by an agitator until a foaming action begins. This normally takes 15 to 20 seconds. Immediately upon the commencement of the foaming action the mixture is poured into the mold for the liner crown section and the mold is instantly closed and locked.

The foaming mixture within the mold is allowed to expand until the foaming action stops. The material thus held within the mold is allowed to gel in the air for approximately 5 minutes.

The crown section mold is then placed in the preheated salt bath which is held in the range of 375° to 425° F. for curing over a period of approximately three minutes. The cure period may be varied somewhat in inverse proportion to the temperature of the bath. Thus a similar product would result with a cure period of 2½ minutes at 475° F. However, the optimum product results from the temperature range above given over a period of approximately 3 minutes. The salt bath affords a means of applying an even curing temperature to all parts of the material within the mold at the same time. This produces a cellular structure which is consistently uniform in physical properties.

At the termination of three minutes immersion in the salt bath, the mold is removed and allowed to air cool to approximately 200° F. at which time the formed crown section of the liner is removed from the mold. At this point, excess material may be trimmed from the crown section as necessary.

The crown section is then placed in a holding fixture and several radially extending slots are cut in the same from the periphery thereof toward the center. This operation provides additional flexibility to the crown section while simultaneously affording cavities for the liner foam material to penetrate in the final fabrication of the liner. It is obvious that other methods of slitting or perforating the crown section to provide access for the foaming material of the liner proper to penetrate could be utilized. As stated, however, the slitted form adds resilience as well as providing access openings for the foaming material.

For the preparation of the sound absorbing portion of the liner which is to cover substantially the entire inner surface of the helmet shell 88 parts by weight of F29R resin are mixed with 12 parts by weight of F29C catalyst. This ratio of resin to catalyst may be varied to obtain a similar end product; however, the ratio of 88 parts resin to 12 parts catalyst gives the most desirable product for the use intended. The previously completed crown section is inserted into the liner mold. Any inserts such as those for providing ear cavities are inserted into the mold at this time.

The mixture of the F29R resin and F29C catalyst are thoroughly mixed in a high speed agitator for 15 to 20 seconds until the resulting foaming action begins. The mixture is then immediately poured into the liner mold and the mold mandrel is inserted and locked instantly. The mixture is permitted to expand in the mold about the mandrel until the foaming action ceases at the vent holes of the mold. The foamed material will fill the liner mold and will flow through the slots in the crown section to thereby lock the crown section to the more flexible sound absorbing liner portion undergoing formation. The mold at this time is permitted to air gel for 10 minutes.

The mold is then placed in an infra-red oven for approximately 20 minutes. The purpose in this step is to remove entrapped gases from the material. This must be accomplished while the material is held in the mold so that warpage and a loss of shape will not result. Although heat from the sun would be the best medium for this operation, the time elements involved dictate a faster method. It has been found that infra-red rays will accomplish the dissipation of these gases without causing accelerated desication of the material.

After treatment in the infra-red oven the mold is removed and permitted to cool to below 200° F. at which time the complete liner may be removed.

The liner is then placed in a post-cure infra-red circulating oven at approximately 250° F. for five hours. This time and temperature relationship may be somewhat varied with slightly higher temperatures for a lower period of time. At a lower temperature it is obvious the cure period would be greater. The relationship given, however, produces what is considered to be the most satisfactory cure of the liner. Up to this point the material still retains a considerable amount of moisture even though it is sufficiently formed to be removed from the mold. The final curing and againg of the material is accomplished in the aforesaid low temperature circulating air infra-red oven. The complete aging of this material by a very slow withdrawal of moisture in natural sunlight would be the best method of procedure, but since such a prolonged post-cure is prohibitive in production practices, it has been established that this low heat infra-red source is the closest to a natural cure.

The liner may subsequently be removed from the oven and the flashing thereon may be trimmed so that the liner may be inserted into the cavity of the hard shell helmet which is formed by another process.

It has been found by considerable experimentation that the use of the pre-heated liquid salt bath for approximately three minutes in curing the crown section mold results in a crown section of improved energy absorbing characteristics. It likewise has been found that the curing of the entire liner mold in the infra-red oven for 20 minutes followed by a post-cure in the air circulating infra-red oven for about five hours produces a liner with exceptionally high quality sound absorbing characteristics. Therefore, we have a complete liner assembly consisting of a crown section of high energy absorbing quality secured to the liner proper having high sound absorbing qualities.

The complete process is shown in the accompanying drawing wherein the various steps of the process are designated and wherein the formation of the liner at various stages of the process is illustrated. The resin and catalyst are placed in a hi-speed mixer 10. After agitation in mixer 10, the foaming mixture 11 is placed in female mold 12 followed by closure of the mold with member 13. The foamed and shaped mixture in the mold is allowed to air gel and is then placed in a liquid salt bath, indicated at 14. After removal of the mold from the bath, the formed crown portion 15 of the finished product is removed from the mold, is trimmed and slit at 16 by suitable machinery. After this step the crown section has the appearance as illustrated at 17. The crown section 15 is then placed in a second female mold 18. A second resin and catalyst mixture 19 is placed in mixer 20 and is then agitated to a foaming condition. It is then placed in mold 18 with the crown section 15. The mold is then closed by mandrel member 21 and the mold assembly is allowed to air gel at 22. The mold assembly is then subjected to heat lamps at 23 for curing the liner material. After removal of the mold assembly from the oven at 24 the completed liner assembly is removed from the mold at 25 and is subjected to a post-cure oven treatment at 26. The completed liner assembly 27 illustrates how the second foamed resin 19 interlocks with the crown section 15 when the said second resin mixture is closed in the mold 18 by the member 21. The second resin material actually runs through the openings or slits 28 placed in crown section 15 at step 16 and during the subsequent curing steps effectively locks the inner on flexible liner area 29 to the crown section 15.

The process of the instant invention is considered a substantial improvement over the inventor's prior process which did not include certain of the cure steps in the manner recited and more specifically did not include the salt bath cure for the crown section mold. Applicant's prior process for which patent protection was not sought comprised merely the joining together of a crown section to the liner proper by slitting a molded crown unit with subsequent joining in a mold by the foaming action of the liner material.

It is quite obvious that certain steps in this process might be modified to a degree which process would still result in the production of a product having similar appearance but somewhat inferior physical characteristics to the product produced by the instant process. The critical steps in this process include the treatment by the liquid salt bath of the crown section mold, the treatment of the entire assembly within the mold in the infra-red oven and the step of post-curing in an air circulating oven for five hours.

I claim:

1. The process of forming and joining together two or more pieces of foamable polyurethane material, each piece having a different density and different physical characteristics, which comprises forming a first piece of said material in a mold, placing said mold in a preheated liquid salt bath at 375° to 425° F. for curing for a period of approximately three minutes, removing said mold from the salt bath, perforating the first piece so formed at a plurality of points, placing said first piece in a second mold, pouring a liquid plastic mixture for forming the second piece into said second mold, air gelling said mold, placing said mold in an infra-red oven for approximately 20 minutes, removing the complete product so formed from said mold, and placing said product in a post-cure air circulating oven at approximately 250° F. for about five hours.

2. The process of forming an aircraft helmet liner having an energy absorbing crown section and a sound absorbing section which comprises mixing a foamable polyurethane resin with a catalyst to initiate a foaming action, placing said foaming mixture immediately into a mold for forming the crown section of the liner, air gelling the mixture in the mold for about five minutes, placing said mold in a pre-heated liquid salt bath at 375° to 425° F. for three minutes to cure the mixture, removing said mold from the salt bath, removing the formed crown section from the mold, perforating said crown section at a plurality of points, placing said formed crown section in a second liner mold, mixing a polyurethane resin of similar characteristics to the crown section resin with a catalyst to initiate a foaming action, pouring said foaming mixture immediately into said liner mold, air gelling said mixture in the liner mold for about ten minutes, placing said mold in an infra-red oven for 20 minutes, removing said liner with the now integrally joined crown section from the liner mold, placing said liner in a post-cure air circulating oven at 250° F. for a five hour cure and removing said liner from the oven.

3. The process of forming and joining together two or more pieces of the same class of foamable polyurethane material, each piece having a different density and different physical characteristics, which comprises forming a first piece of said material in a mold, air gelling said mold, placing said mold in a pre-heated liquid salt bath at 375° to 425° F. for curing for a period of approximately three minutes, removing said mold from the salt bath, removing the first piece of material from the mold, perforating the first piece of material at a plurality of points, placing said first piece of material in a second mold, pouring the foamable polyurethane material for the second piece of material into said second mold, air gelling said mold, placing said second mold in an infra-red oven for 15 to 25 minutes, removing the product formed from said mold and placing said product in a post-cure air circulating oven for 4 to 6 hours.

4. The process of forming an aircraft helmet liner having an energy absorbing crown section and a sound absorbing section which comprises mixing a polyurethane resin with a catalyst to initiate a foaming action, placing said resulting foaming mixture immediately into a mold for forming the crown section of the liner with a density such as to make the section relatively stiff with low resilience, air gelling the mixture in the mold to allow it to set, placing said mold in a pre-heated liquid salt bath at 375° to 425° F. for a period of approximately three minutes to cure the mixture, removing the mold from the salt bath, removing the formed crown section from the mold, slitting said crown section at a plurality of points, placing said crown section in a liner mold, mixing a polyurethane resin of similar characteristics as the crown section resin with a catalyst to initiate a foaming action, pouring said foaming mixture immediately into said liner mold in contact with the crown section to form a sound absorbing section for the liner, air gelling said mixture in the liner mold to permit it to set with a relatively lower density to make the section relatively resilient compared to the crown section, placing said mold in an infra-red oven for 15 to 25 minutes, removing said liner with the now integrally joined crown section and sound absorbing section from the liner mold, placing said liner in a post-cure air circulating oven at approximately 250° F. for 4 to 6 hours, and removing said liner from the oven.

5. The process of forming an aircraft helmet liner having an energy absorbing crown section and a sound absorbing section which comprises mixing a polyurethane resin with a catalyst to initiate a foaming action, placing the resulting foaming mixture immediately into a mold for forming the crown section of the liner with a density such as to make the section relatively stiff with low resilience, air gelling the mixture in the mold for approximately 5 minutes to allow it to set, placing said mold in a pre-heated liquid salt bath at 375° to 425° F. for a period of approximately three minutes to cure the mixture, removing the mold from the salt bath, removing the formed crown section from the mold, slitting said crown section at a plurality of points, placing said crown section in a liner mold, mixing a polyurethane resin of similar characteristics as the crown section resin with a catalyst to initiate a foaming action, pouring said foaming mixture immediately into said liner mold in contact with the crown section to form a sound absorbing section for the liner, air gelling said mixture in the mold for approximately 10 minutes to permit it to set with a lower density to make the section relatively resilient compared to the crown section, placing said mold in an infra-red oven for approximately 20 minutes, removing said liner with the now integrally joined crown section and sound absorbing section from the liner mold, placing said liner in a post-cure air circulating oven at approximately 250° F. for a period of about 5 hours, and removing said liner from the oven.

6. The process of forming an aircraft helmet liner having a high density, low resilience energy absorbing crown section and a low density, high resilience sound absorbing section which comprises mixing a first foamable polyurethane resin with a catalyst, said resin and catalyst mixture being capable of forming the energy absorbing crown section, placing said foaming mixture immediately into a mold for forming the crown section, air gelling the mixture in the mold, placing the mold in a pre-heated liquid salt bath to cure the mixture, removing the mold from the salt bath, removing the formed crown section from the mold, slotting the crown section at a plurality of points, placing said formed crown section in a second liner mold, mixing a second foamable polyurethane resin with a catalyst to initiate a foaming action, said second resin and catalyst mixture being capable of forming the sound absorbing section of the liner, pouring said foaming mixture immediately into the second liner mold, air gelling said mixture in the mold, placing said mold in an oven under heat to cure the resin, removing the liner, with the now integrally joined crown section and sound absorbing section, from the mold, placing the liner in a post-cure air circulating oven for further cure of the resins, and removing the completed liner from the oven.

References Cited in the file of this patent

UNITED STATES PATENTS

| | | |
|---|---|---|
| 2,388,042 | Daily | Oct. 30, 1945 |
| 2,625,683 | Roth et al. | Jan. 20, 1953 |
| 2,741,800 | Brockway | Apr. 17, 1956 |
| 2,763,005 | Richter | Sept. 18, 1956 |
| 2,785,440 | Toulmin | Mar. 19, 1957 |

FOREIGN PATENTS

| | | |
|---|---|---|
| 777,411 | Great Britain | June 19, 1957 |